United States Patent
Sharif et al.

(10) Patent No.: US 7,194,513 B2
(45) Date of Patent: Mar. 20, 2007

(54) SYSTEM AND METHOD FOR USING AN INTERNET APPLIANCE TO SEND/RECEIVE DIGITAL CONTENT FILES AS E-MAIL ATTACHMENTS

(76) Inventors: Imran Sharif, 554 Valley Way, Milpitas, CA (US) 95035; Shabbir Syed Husain, 11, Mohakhali C/A, (3rd Floor), Dhaka (BD) 1212; Pijush Chakraborty, 11, Mohakhali C/A, (3rd Floor), Dhaka (BD) 1212

( * ) Notice: Subject to any disclaimer, the term of this patent is extended or adjusted under 35 U.S.C. 154(b) by 741 days.

(21) Appl. No.: 09/901,405

(22) Filed: Jul. 8, 2001

(65) Prior Publication Data

US 2003/0009528 A1    Jan. 9, 2003

(51) Int. Cl.
G06F 15/16    (2006.01)
G06F 13/00    (2006.01)

(52) U.S. Cl. .................. 709/206; 709/204; 345/329; 345/331; 345/339

(58) Field of Classification Search ........ 709/226–228, 709/245, 250, 200–206; 345/619, 329; 707/101–102, 707/10; 370/61
See application file for complete search history.

(56) References Cited

U.S. PATENT DOCUMENTS

| | | |
|---|---|---|
| 4,405,829 A | 9/1983 | Rivest et al. |
| 4,549,279 A | 10/1985 | Lapeyre |
| 4,590,470 A | 5/1986 | Koenig |
| 4,985,863 A | 1/1991 | Fujisawa et al. |
| 5,155,847 A | 10/1992 | Kirouac et al. |
| 5,206,905 A | 4/1993 | Lee et al. |
| 5,298,681 A | 3/1994 | Swift et al. |
| 5,485,622 A | 1/1996 | Yamaki |
| 5,524,195 A | 6/1996 | Clanton, III et al. |
| 5,708,776 A | 1/1998 | Kikinis |
| 5,761,436 A | 6/1998 | Nielsen |
| 5,809,251 A | 9/1998 | May et al. |
| 5,819,292 A | 10/1998 | Hitz et al. |
| 5,826,015 A | 10/1998 | Schmidt |
| 5,844,552 A | 12/1998 | Gaughan et al. |
| 5,847,697 A | 12/1998 | Sugimoto |
| 5,874,939 A | 2/1999 | Galvin |
| 5,889,949 A | 3/1999 | Charles |
| D411,534 S | 6/1999 | Lepack et al. |
| 5,909,540 A | 6/1999 | Carter et al. |
| 5,918,229 A | 6/1999 | Davis et al. |
| 5,937,380 A | 8/1999 | Segan |

(Continued)

Primary Examiner—David Wiley
Assistant Examiner—Jude Jean-Gilles
(74) Attorney, Agent, or Firm—Robert Buckley

(57) ABSTRACT

A system for using an Internet appliance for sending and receiving digital content files as email attachments includes a system server and an Internet appliance both connected to a communications network such as the Internet. The Internet appliance and system server define communication and control protocols based on server maintained user interface display screens and Internet appliance received reduced keyset keystroke sequences. The protocols define text entry and editing, and option selection and navigation via hyperlinks embedded within the user interface display screens. An email protocol permits selection of server stored digital content files for attachment to outgoing emails and the receiving and viewing-of/listening-to video/audio digital content files that arrive as email attachments. All digital content files are maintained at the server and accessible at the Internet appliance only for viewing via browser and listening. Standard email protocols are used by the server to exchange emails and attachments with standard Internet email severs.

11 Claims, 17 Drawing Sheets

U.S. PATENT DOCUMENTS

| | | |
|---|---|---|
| 5,940,074 A | 8/1999 | Britt, Jr. et al. |
| 5,960,411 A | 9/1999 | Hartman et al. |
| 5,983,227 A | 11/1999 | Nazem et al. |
| 5,983,262 A | 11/1999 | Kukkal |
| 5,987,506 A | 11/1999 | Carter et al. |
| 5,987,621 A | 11/1999 | Duso et al. |
| 5,995,540 A | 11/1999 | Draganic |
| 5,995,943 A | 11/1999 | Bull et al. |
| 6,005,476 A | 12/1999 | Valiulis |
| 6,005,563 A | 12/1999 | White et al. |
| 6,006,034 A | 12/1999 | Heath et al. |
| 6,009,524 A | 12/1999 | Olarig et al. |
| 6,011,554 A | 1/2000 | King et al. |
| 6,018,345 A | 1/2000 | Beratis |
| 6,021,399 A | 2/2000 | Demers et al. |
| 6,021,418 A | 2/2000 | Brandt et al. |
| 6,026,474 A | 2/2000 | Carter et al. |
| 6,029,175 A | 2/2000 | Chow et al. |
| 6,038,570 A | 3/2000 | Hitz et al. |
| 6,041,346 A | 3/2000 | Chen et al. |
| 6,049,835 A | 4/2000 | Gagnon |
| 6,052,367 A | 4/2000 | Bowater et al. |
| 6,052,696 A | 4/2000 | Euler et al. |
| 6,052,725 A | 4/2000 | McCann et al. |
| 6,055,566 A | 4/2000 | Kikinis |
| 6,061,659 A | 5/2000 | Murray |
| 6,061,668 A | 5/2000 | Sharrow |
| 6,061,740 A | 5/2000 | Ferguson et al. |
| 6,064,449 A | 5/2000 | White et al. |
| 6,065,043 A | 5/2000 | Domenikos et al. |
| 6,065,049 A | 5/2000 | Beser et al. |
| 6,065,061 A | 5/2000 | Blahut et al. |
| 6,067,098 A | 5/2000 | Dye |
| 6,067,582 A | 5/2000 | Smith et al. |
| 6,069,310 A | 5/2000 | James |
| 6,070,174 A | 5/2000 | Starek et al. |
| 6,070,191 A | 5/2000 | Narendran et al. |
| 6,072,861 A | 6/2000 | Yu |
| 6,073,168 A | 6/2000 | Mighdoll et al. |
| 6,073,171 A | 6/2000 | Gaughan et al. |
| 6,073,177 A | 6/2000 | Hebel et al. |
| 6,073,214 A | 6/2000 | Fawcett |
| 6,074,434 A | 6/2000 | Cole et al. |
| 6,075,568 A | 6/2000 | Matsuura |
| 6,076,168 A | 6/2000 | Fiveash et al. |
| 6,076,734 A | 6/2000 | Dougherty et al. |
| 6,078,757 A | 6/2000 | Saito et al. |
| 6,078,886 A | 6/2000 | Dragosh et al. |
| 6,078,929 A | 6/2000 | Rao |
| 6,078,954 A | 6/2000 | Lakey et al. |
| 6,078,961 A | 6/2000 | Mourad et al. |
| 6,080,207 A | 6/2000 | Kroening et al. |
| 6,081,835 A | 6/2000 | Antcliff et al. |
| 6,081,837 A | 6/2000 | Stedman et al. |
| 6,084,859 A | 7/2000 | Ratcliff et al. |
| 6,085,126 A | 7/2000 | Mellgren, III et al. |
| 6,085,171 A | 7/2000 | Leonard |
| 6,085,195 A | 7/2000 | Hoyt et al. |
| 6,085,321 A | 7/2000 | Gibbs et al. |
| 6,088,544 A | 7/2000 | Saito et al. |
| 6,092,078 A | 7/2000 | Adolfsson |
| 6,094,277 A | 7/2000 | Toyoda |
| 6,096,096 A | 8/2000 | Murphy et al. |
| 6,097,383 A | 8/2000 | Gaughan et al. |
| 6,098,056 A | 8/2000 | Rusnak et al. |
| 6,098,089 A | 8/2000 | O'Connor et al. |
| 6,101,472 A | 8/2000 | Giangarra et al. |
| 6,101,473 A | 8/2000 | Scott et al. |
| 6,101,548 A | 8/2000 | Okada |
| 6,104,373 A | 8/2000 | Klein |
| 6,108,629 A | 8/2000 | Kasday |
| 6,108,637 A | 8/2000 | Blumenau |
| 6,108,703 A | 8/2000 | Leighton et al. |
| 6,112,176 A | 8/2000 | Goldenthal et al. |
| 6,115,030 A | 9/2000 | Berstis et al. |
| 6,118,230 A | 9/2000 | Fleischmann |
| 6,119,088 A | 9/2000 | Ciluffo |
| 6,119,155 A | 9/2000 | Rossmann et al. |
| 6,119,244 A | 9/2000 | Schoenthal et al. |
| 6,199,204 B1 | 3/2001 | Donohue |
| 6,252,588 B1 * | 6/2001 | Dawson ..................... 345/752 |
| 6,304,898 B1 * | 10/2001 | Shiigi ........................ 709/206 |
| 6,411,685 B1 * | 6/2002 | O'Neal .................... 379/88.14 |
| 6,545,768 B1 * | 4/2003 | Matsubara et al. ........ 358/1.15 |
| 6,598,076 B1 * | 7/2003 | Chang et al. ............... 709/206 |
| 6,631,247 B1 * | 10/2003 | Motoyama et al. ............ 399/8 |
| 6,693,729 B1 * | 2/2004 | Bloomfield ................. 358/402 |

\* cited by examiner

SYSTEM AND METHOD FOR USING AN INTERNET APPLIANCE TO SEND/RECEIVE DIGITAL CONTENT FILES AS E-MAIL ATTACHMENTS

RELATED APPLICATIONS

This patent application is related to each of the following U.S. patent applications and provisional patent applications, all filed on Jul. 8, 2001, and under an obligation of assignment to UNIQA, Inc.: U.S. Provisional Patent Application 60/304,009 for "Voice Annotation System and Method," U.S. Provisional Patent Application 60/304,002 "Method and Apparatus for Dynamically Changing A User Interface In An Internet Appliance," U.S. patent application 670/901,544 for "System and Method for Internet Appliance Data Entry and Navigation," U.S. Provisional Patent Application Ser. No. 60/303,982 for "System and Method for Peer-to-Peer Exchanges of Digital Content Files Using An Internet Appliance," and U.S. Provisional Patent Application 60/304,001 for "System and Method for Password Generation and for Digital Certificate Creation and Authentication." This patent application is also related to each of the following provisional patent applications, all filed on Jul. 11, 2000, and under an obligation of assignment to UNIQA, Inc.: U.S. Provisional Patent Application No. 60/217,626 for "Internet Appliance for Interactive Audio/Video Display Using A Remote Control Unit for User Input"; U.S. Provisional Patent Application No. 60/217,627 for "Fax-Compatible Internet Appliance"; and U.S. Provisional Patent Application No. 60/217,628 for "WEB Browser Implemented In An Internet Appliance Using A Remote Control Unit for User Input."

FIELD OF THE INVENTION

The present invention pertains to the field of data communication through email, and more specifically to a method for sending and receiving data files, images, and audio (digital content) files via an Internet appliance using a TCP/IP based electronic mail protocol.

BACKGROUND OF THE INVENTION

Access to the Web has thus far been limited to people who have access to a personal computer. Yet many people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface that requires them to identify hypertext objects and use the point-and-click technique to browse through Web pages.

Most people, however, feel quite comfortable using a remote control to operate a television set. Therefore, it would be desirable to provide a means by which a person can access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

There is a need for a person having access to an Internet appliance having a simple user interface for exchanging digital content files, such as data files, images, and audio files, with other Internet users.

SUMMARY OF THE INVENTION

That need, and others that will become apparent, is met by the present invention which, in a preferred embodiment, defines a method for exchanging digital content files as standard email attachments.

An embodiment of the invention includes innovations in the field of content provision and an extension of the album features of Imagia™, namely Mail Albums. Another embodiment permits a list of MIME formatted attachment files to be sent via email. A user is not required to write file names and email addresses using a console, as done in conventional mail send clients. A server implemented Mail Receive module acts as a virtual client for all users of the POP server and fetches emails for them. The mail is not presented directly to the clients. Instead of using a conventional mailbox system, all valid attachment files are generated from the mails and are stored in a directory structure. This directory structure is maintained within a system server and acts as a virtual mailbox for the clients, which holds only attachment files and mail body files, but not the raw mails. Clients gather their mails from this directory structure. The client experiences an extension of the Gallery and Albums feature we name Mail Album.

The claimed invention is an electronic communication method for Internet appliances especially EdenBox™ (hereafter "Internet appliance"). Using the invention, users can send and receive mails for Internet appliances or on the Internet. The invention requires physical servers and storage facilities, customized to serve the invented protocol. When a mail is received for an EdenBox™ client, the mail is broken down to separate the body of the mail and its attachments. The body and the attachments are MIME decoded if needed and saved as files. These files are stored in the EdenBox™ clients' directories, namely My Album. When the clients use the UNIQA™ EdenBox™ Internet appliance, the user can see the received mail and its attachments as items in the clients' Mail Album. EdenBox™ and UNIQA™ are trademarks of UNIQA, Inc.

The EdenBox™ user can send items that can be browsed through the Internet appliance. When the user mails items, the items are attached with the mail and sent to the recipients. The recipients can be Internet appliance users or general users who have access to the Internet.

The invention differs from the standard electronic mail methods in the following ways:

The method is customized for Internet Appliance EdenBox™ users.

No physical data items are transferred from the Internet appliances to the recipient while sending the mail.

A command is passed to the server that the Internet appliance is connected to, in order to send mail. The sever takes action according to the command and transfers the files accordingly.

When mail is received the server again processes the mail to split the body and the attachments, and stores them in the client's directory. The server also prepares the files so that the Internet appliance user can view it.

All mail sending and receiving procedures are highly configurable since configuration files control the policy of the protocol.

DESCRIPTION OF THE PREFERRED EMBODIMENT

The disclosures of each patent application and provisional patent application listed in the Related Applications section, above, are incorporated by reference herein.

Figure 19:
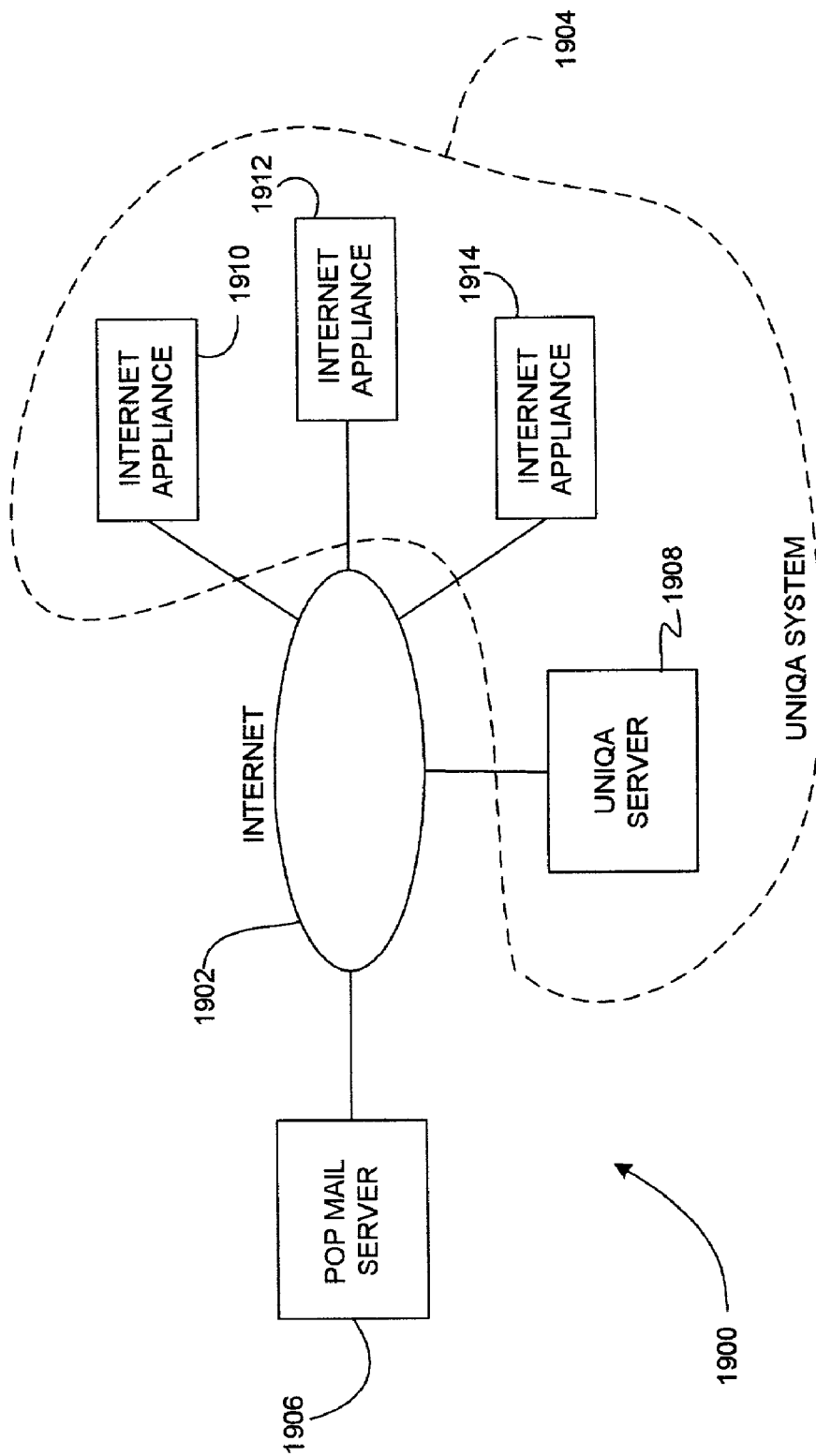
FIG. 19 is a pictorial diagram that illustrates a digital content file exchange system using email attachments according to one aspect of the present invention.

FIG. 19—An Overview

FIG. 19 is a pictorial diagram that illustrates a digital content exchange system using email attachments according to one aspect of the present invention. The system is designated generally by the reference numeral 1900. The system 1900 includes access to a communications network 1902, such as the Internet, and access via the network to a mail server (POP server) 1906. The system 1900 also includes a proprietary network service (UNIQA System) 1904. The proprietary network service 1904, and the mail server 1906 are interconnected via the communications network 1902 for exchanging email and email attachments.

The proprietary network service 1904 is more specifically defined in related U.S. patent applications and provisional patent applications, and includes a server (UNIQA server) 1908, and a plurality of Internet Appliances (EdenBox™) 1910–1914, all interconnected via the communications network 1902. Each Internet appliance 1910–1914 appears as a client with respect to the UNIQA server 1908, while the UNIQA server 1908 appears as a client to the mail server 1906.

In a specific embodiment, all digital content files within the UNIQA system 1904 reside in storage at the UNIQA server 1908, and are available in TV-HTML format to a browser within each Internet appliance. The digital content files are not stored at the Internet appliances. Digital content files are typically video, still photograph, and audio files, but other digital content files are also within the scope of the invention.

To send one or more digital content files that are already stored at the UNIQA server 1908, the user identifies the files and the intended file recipient's email address. This information is forwarded to the UNIQA server 1908 from the user's Internet appliance. The UNIQA server 1908 locates the selected file(s) within its file storage (not shown) and creates an email listing the files and providing the intended recipient's address. The mail message is forwarded from the UNIQA server 1908 to the mail server 1906 via the communications network using standard TCP/IP protocols. The digital content files portion is forwarded to the mail server using the file transfer protocol FTP:// so that the transfer can be conducted by the UNIQA server 1908 in background mode to permit rapid server response to other Internet appliance requests.

Digital content files requested by an Internet appliance user are first sought within the UNIQA server storage. When not available in storage, the UNIQA server 1908 uses email procedures in an attempt to locate the requested file on the Internet 1902. When the requested file is successfully returned to the UNIQA system 1904 by the mail server 1906, the file is identified as an attachment to an email. The UNIQA server 1908 obtains the digital content file(s) from the mail server 1906 using the file transfer protocol FTP://, to provide greater task scheduling flexibility, as described above. Once the requested digital content file(s) have been transferred, the UNIQA server 1908 separates the email and the attached file, stores the file in server storage, and after file formatting for delivery as a TV-HTML document, notifies the requesting user via the user's Internet appliance.

The invention is divided in to two main parts. The first part is a Mail Send Module used to send email and attached digital content files from one Internet appliance to another, and to email addresses beyond the UNIQA system 1904. The second part is a Mail Receive Module used by an Internet appliance to request digital content files stored on the UNIQA server 1908 but owned by a different appliance or user, and to request digital content files located beyond the UNIQA system 1904. The two modules are software components located at the UNIQA server 1908, and taken together describe the underlying architecture of the invention. The invention also defines a protocol for digital content file exchanges using email attachments.

Figure 1:
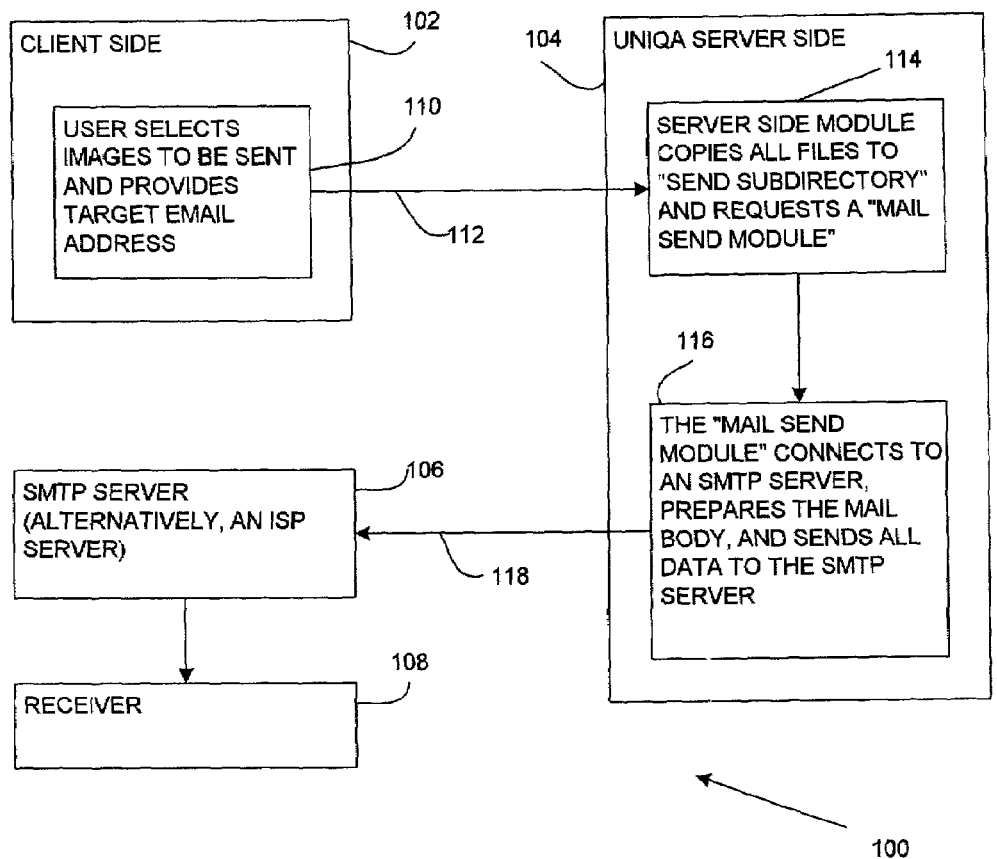
FIG. 1 is a process flow diagram illustrating a mail send procedure according to one aspect of the present invention.
Figure 2:
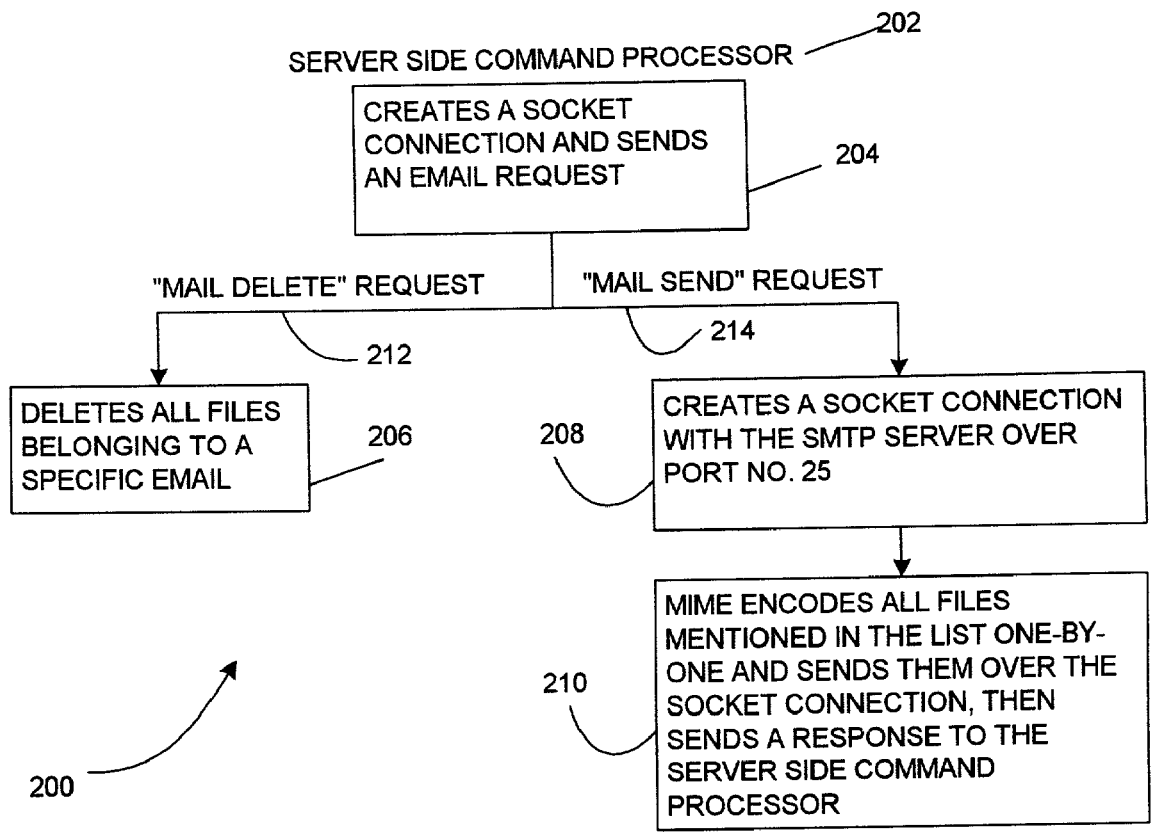
FIG. 2 is a block diagram that illustrates command parsing for the mail send module.
Figure 3:
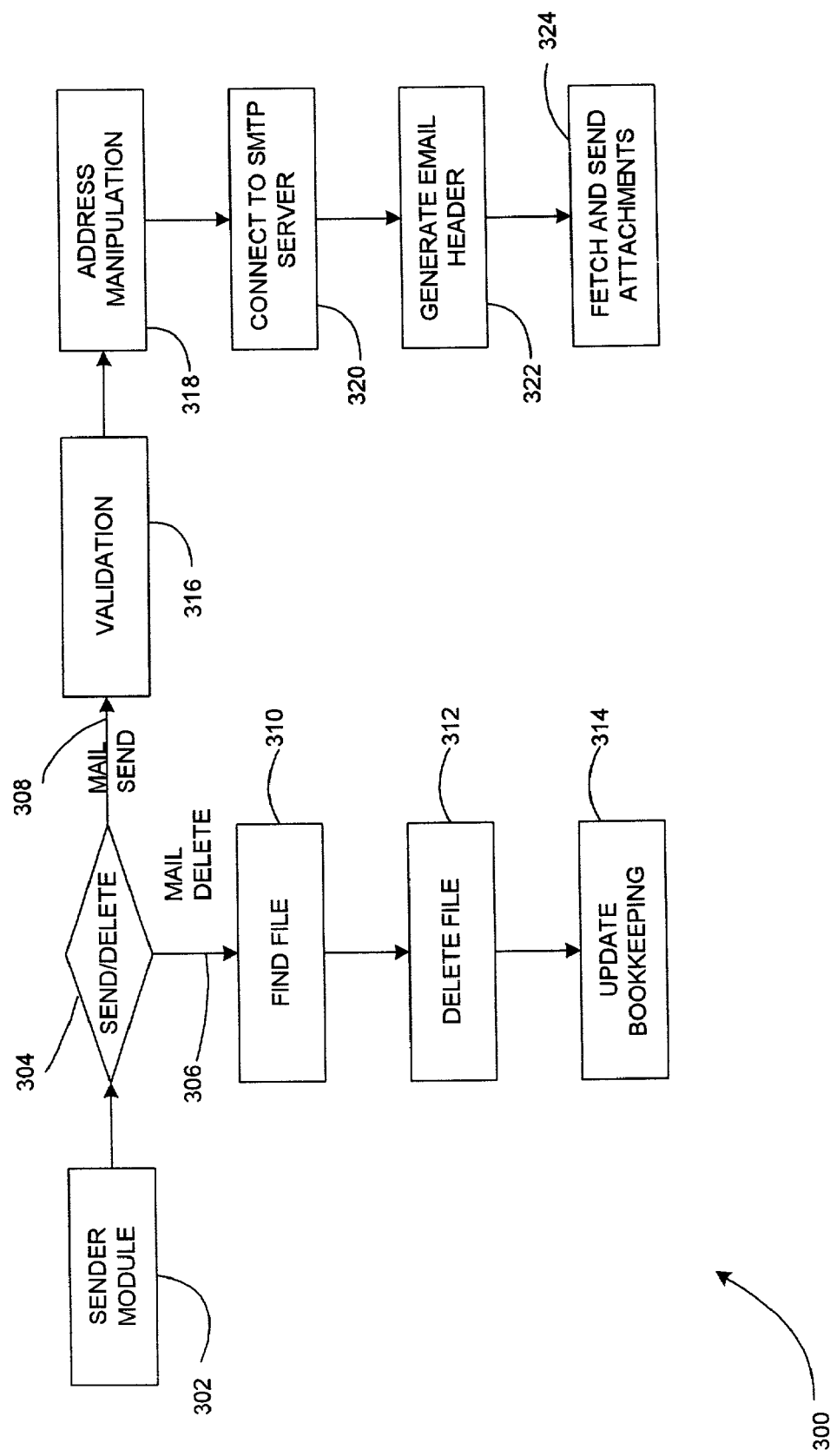
FIG. 3 is a block diagram that illustrates mail handling procedures for the mail send module.

FIGS. 1–3, A Mail Send Module

The Mail Send module, as illustrated in FIG. 1, compromises the steps of:
  Methods to send email to another Internet appliance especially EdenBox™ users as standard emails.
  Methods to have the option to send images to other persons using general email All images that the user wants to send will be sent as one or more attachments of an email.

The mail body and subject of the email will be empty.

The mail will have only one receiver.

The user interface on the client side will initiate the email process

The process of termination of mail send will end by sending all data to a standard SMTP server.

In order for a user to send the images, audio or any other data files:

The said data files must reside in the server with which the said Internet appliance (EdenBox™) maintains its storage.

Data files that the user wants to send also reside in a subdirectory of the said server. So that the client side software can send only the name of the target files and receiver email address to the server to send the email.

When a user selects data files, image files and also all associated audio files, their names are entered in a text file. The target email address is also entered in that text file. A separate thread is created to prepare and send this generated text file to the Uniqa© server. The same thread also waits for the server confirmation.

When the file is ready, the file is sent to the server using a FTP connection. At the same time, a mail send request will be sent to the server side command processor.

FIG. 1 is a process flow diagram illustrating a mail send procedure according to one aspect of the present invention. The mail send procedure is designated generally by the reference numeral 100 and includes a client side 102, a UNIQA server side 104, an SMTP server 106, and an intended file receiver 108.

A user selects images to be sent and provides a recipient's ("target") email address, message creation process 110. The client side 102 defines an Internet appliance. The created message is sent 112 via a communications network to the UNIQA server side 104. A server side file selection process 114 copies all files requested by the message to a send subdirectory (not shown), and requests a mail send module. A server side mail send module 116 establishes a connection via the communications network with an SMTP mail server 106. The mail send module 116 prepares the mail body, and sends 118 all requested files to the SMTP server. The SMTP server 106 processes the mail and attached data files and delivers these to the intended receiver 108.

FIG. 2 is a block diagram that illustrates command parsing for the mail send module. The parsing process is designated generally by the reference numeral 200, and includes a server side command processor 202, a client side socket creation process 204, a delete-all-files process 206, a UNIQA server side socket creation process 208, and a UNIQA server file encoding and transmission process 210.

The user Internet appliance creates an email message defining user owned/controlled files to be deleted from the UNIQA server file storage, or alternatively defining user owned/controlled files located at the UNIQA server file storage to be transmitted to the intended recipient. The Internet appliance creates a socket connection 204 with the UNIQA server and sends the email request. The UNIQA server (1908 of FIG. 19) parses the request and determines that it is a mail delete request, or alternatively a mail send request 214.

The UNIQA server deletes 206 user owned/controlled files located at the server storage in response to a mail delete request. The UNIQA server response to a mail send request 214 is to create a socket connection 208 with the SMTP mail server. The UNIQA server MIME encodes all requested user owned/controlled files stored at the UNIQA server storage. The encoded files are transferred to the SMTP server using a file transfer protocol. The transferred files are treated by the mail SMTP mail server as email file attachments.

FIG. 3 is a block diagram that illustrates mail handling procedures for the mail send module. The mail handling procedures are designated generally by the reference numeral 300. The procedures 300 provide additional details of the server side command processor 202 of FIG. 2.

A sender module 302 at an Internet appliance sends an email file request message to the UNIQA server (1908 of FIG. 19). A request parsing process 304 determines whether the request is a mail delete request, or alternatively a mail send request. A mail delete request initiates a file location process within the UNIQA server. When a file to be deleted has been located, the file is deleted 312 from the UNIQA server file storage, and file maintenance records are updated 314 by the UNIQA server. When a mail send request 308 is recognized, a Validation step 316 validates all information from the client relating to the request. Next, an Address Manipulation step 318 formats the intended recipient address if the user provided recipient address contains dot-formatted IP address information. Next, a socket connection is established 320 with an SMTP mail server, and the mail send module sends all email and initialization handshaking commands. Next the mail send module generates an email header 322, including unique multi-part boundary information. Finally, the mail send module Fetches and Sends all Attachments at step 324 The attachment files are, one by one MIME encoded using the BASE64 method and sent to the SMTP Server.

In a specific embodiment, the encoded files are transferred to the mail server using a standard file transfer protocol FTP://. The use of the standard file transfer protocol permits the file transfers to take place in background mode so that the UNIQA server can be more responsive to individual Internet appliance 1910 requests and needs.

Once an email request is sent 112 from an Internet appliance 1910, the request is received at the UNIQA server 1908. A mail service runs continuously at the UNIQA server side 104. Whenever there is a request received from an Internet appliance, the request generates a new requested information in a local log file. One line of information is created in the log file for each requesting email. The Internet appliance creates a socket connection with the UNIQA server to communicate with the UNIQA server's command processor module. A wait interval of predetermined duration is created for obtaining a mail status report. In a successful process, a mail confirmation is received during this wait interval. There are two types of confirmation: success and failure. When a confirmation (success or failure) is received from the SMTP mail server, the result is written in a log file maintained by the UNIQA server. However, before receiving the confirmation there may be a possibility of a time out. While waiting for the confirmation if the predefined duration of confirmation is over, i.e., the process times out, or when the confirmation arrives after the predefined wait interval has terminated, a failure message is generated and is entered into the log file maintained by the UNIQA server. Thus all status for the mail starting from the request till the confirmation is stored in the UNIQA server log file.

After receiving the mail send request and the mail information text file from a client, the command processor will spawn a new thread. This thread creates a new mail send subdirectory in the client's data directory, which is stored in the Internet appliance's storage management server. The text file is parsed to find Which files are to be sent Who is the recipient of the files It will then copy all the mentioned data files, e.g., image files, audio files, etc., to the newly created send subdirectory. The data files will be given a new name in the new directory irrespective of their original names. If the data files are images, the new name will be 1.jpg, 2.jpg, etc. no matter what their original names were.

Once the mail send subdirectory is created, a socket connection is created to communicate with the mail send module described. This mail module will listen to a predetermined socket port, which is configurable in the configuration file, for connections from the server command processor module described earlier. As soon as a connection is established, a new thread will be created and the mail send request will be accepted. After that, the mail send module will create a connection 320 with the intended SMTP server. Then a standard mail header will be created 322. The mail header contains all necessary fields for a standard email header. The mail header is then sent to the SMTP server. After that, all the files are MIME encoded using, in a specific embodiment, the BASE64 method and sent to the SMTP server as part of an email attachment, one encoded file after another. When the transaction ends successfully, the mail send module sends a success response to the calling module. When any error occurs, the mail send module sends a failure response to the calling module. However when the status confirmation, i.e., success or failure, arrives after the previously described predefined mail timeout duration, the mail process for that session is treated as a failure and the log is updated accordingly.

The mail send module, as illustrated in FIG. 2 and FIG. 3, is responsive to a predetermined socket port for connections from the UNIQA server 1908 command processor module, as previously described. As soon as a socket connection is established 116, 320, a new thread is created and the mail send request is accepted. After that, the mail send module creates a connection with the intended SMTP server. After receiving this information, the thread creates a socket connection with the SMTP server on port 25. The SMTP server 1906 is same machine, or alternatively is a different machine. The mail send module then sends all mail header specific commands over the established connection. In a specific embodiment, the mail header is a standard mail header.

The mail header contains all standard fields such as "From", "To", "MIME version", "Boundary", etc. After the header is created, the requested image and audio files are opened one after another to MIME encode their contents and send over the socket connection. In a specific embodiment, the BASE64 method is used to MIME encode the files. File names are changed to the format as described above in the header for each file's attachment. The given original file names are not used. After all files have been sent, the connection with the SMTP server is closed and a response is sent to the UNIQA server side 104 command processor.

In another specific embodiment, the mail send module 300, shown in FIG. 3, has another functionality in addition to sending email. The mail send module 300 also provides a facility for deleting specified email from a user's mail album directory. A delete mail request 306 arrives from the UNIQA server side 104 command processor and includes the user's name and a number representing the specific email to be deleted. The mail send module 300 creates a child process for this operation, and the child process deletes all the files associated with the identified email. The reason that a child process is created instead of a thread is that the mail delete system function cannot be run from a thread.

This mail send module will have an interaction with two modules, the server side command processor and the mail receive module (not shown). The UNIQA server side command processor creates a socket connection to a predetermined port to send either a send mail or a delete mail request to the mail send module 300. The mail send module is responsive to this port for connections from the UNIQA server side command processor. Parameters for both of these commands have been mentioned above.

Interaction with the mail receive module involves a configuration file. In a specific embodiment, each user will has one configuration file. This file contains only two numbers. The first one is the number of mails currently residing in the mail album directory and it cannot be more than the predefined maximum number for allowed mails. The second number is the serial number of the latest mail. This second number increases as new mails arrive and previously used numbers are not reused. The second number defines a mail serial counter and will continue to increase as new email is received. In a specific embodiment, eight bytes are used for this number, thus there is no realistic risk of counter overflow. Both the mail send module and the mail receive module attempt, independently, to create an interlock file before opening the configuration file so that only one mail process can work with the configuration file at a time. When the mail send module deletes an email, it decreases the first counter 314 saved in the configuration file.

With respect to FIG. 3, the Sender Module 302 receivers a request from a user. A test is made 304 to determine whether the request is a mail delete request 306 or a mail send request 308. When the request is a delete mail request 306, a Find File step 310 locates mail related files in the client (user) data directory. A Delete File step 312 deletes all files related to an email (if any). Finally, an Update Bookkeeping step 314 updates internal bookkeeping, as described above.

FIGS. 4–8, A Mail Receive Module

Mail is received in the Internet Appliance EdenBox™, where

The user has mail album facility in the users Internet appliance, EdenBox™.

The user has a directory in the Uniqa™ Central Database Server (UCDS), hereafter referred to as UCDS (what has been referred to previously as the UNIQA server 1908, FIG. 19, and the UNIQA server side 104, FIG. 1).

All emails received for a particular user, reside in the user's mail album directory.

Figure 5:
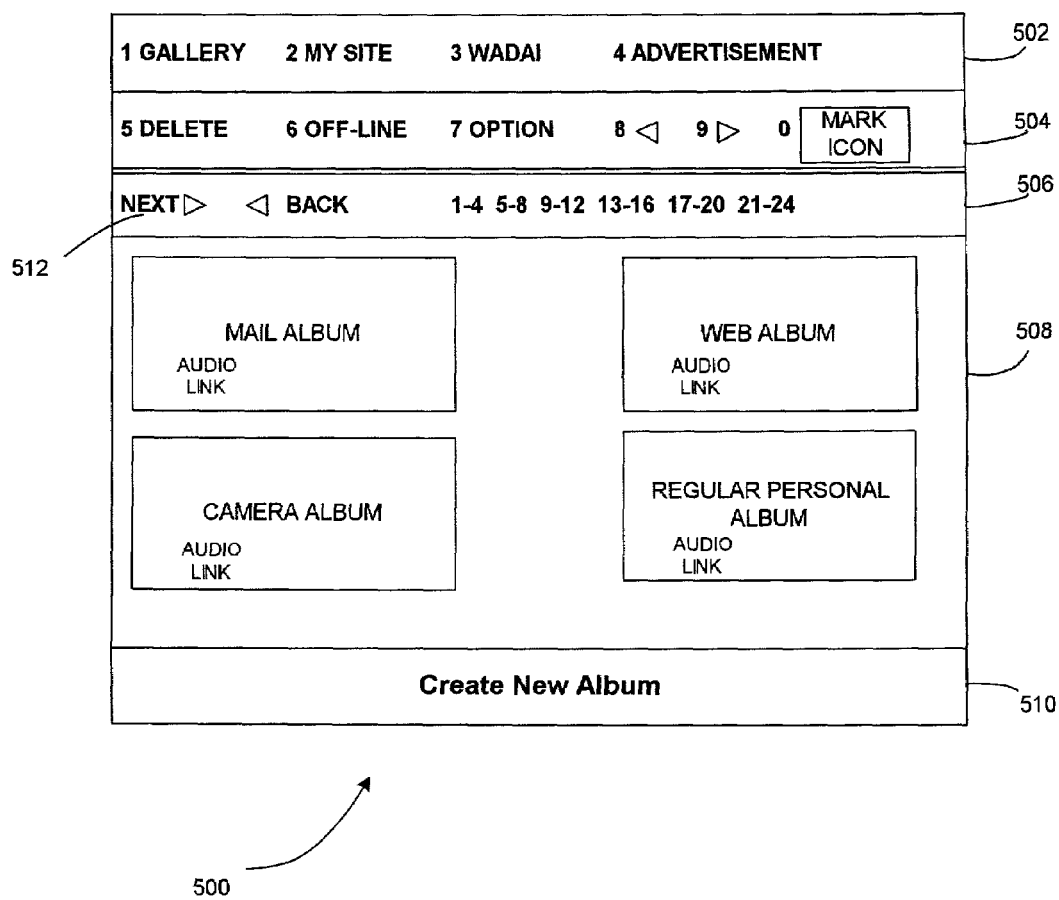
FIG. 5 is a simplified view of a user interface screen display for "My Site."

Each received email is listed as items of the mail album shown in FIG. 5.

Attachments of the email are displayed in the attachment list for that particular email, as shown in the FIG. 6 and FIG. 7, in the mail album The naming scheme for emails and their attachments is discussed in the later part of this description.

Figure 4:
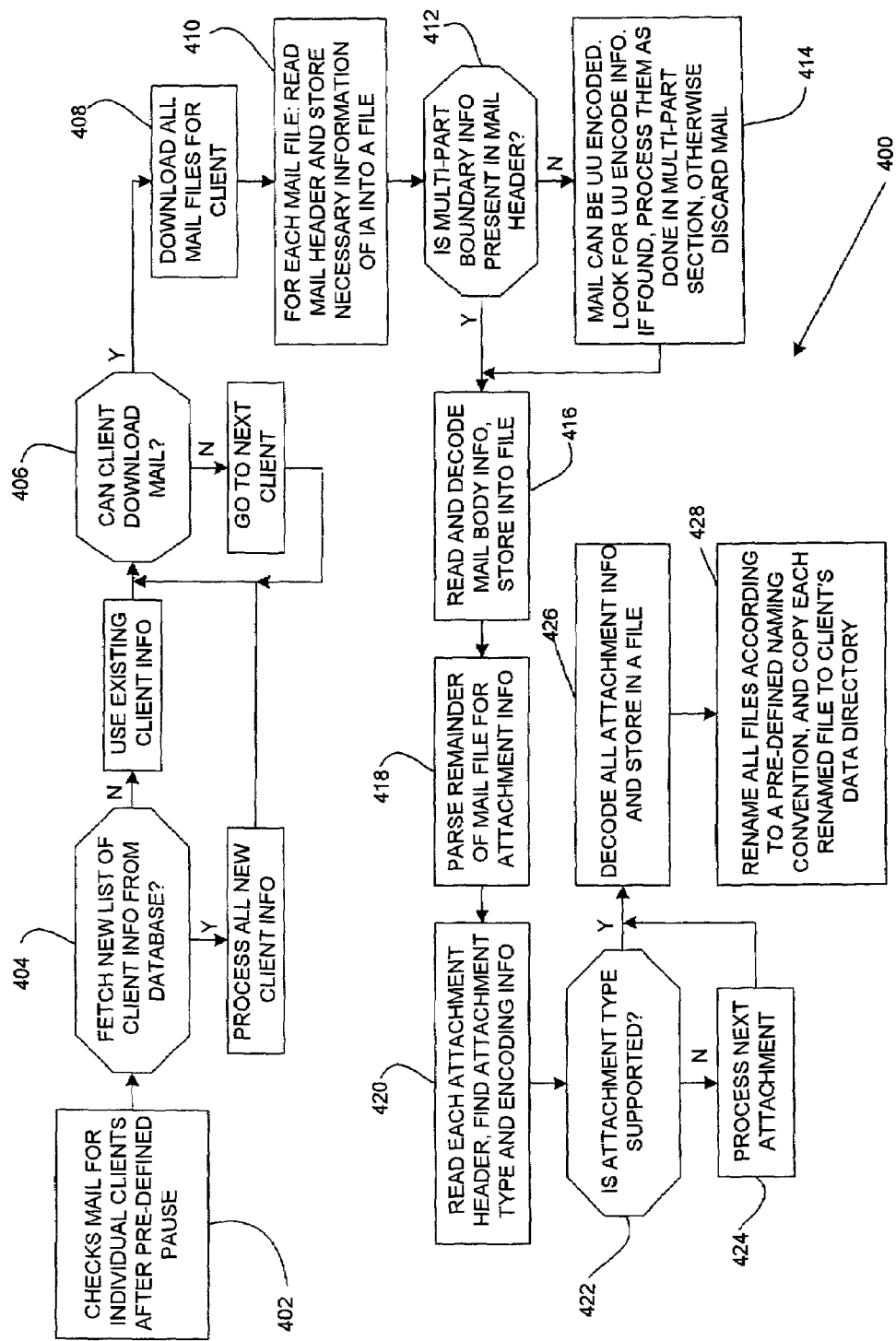
FIG. 4 is a functional block diagram that illustrates a mail receive process.

In the Internet Appliance, EdenBox™ a user can see the emails in a mail album shown in FIG. 4. FIG. 4 also shows a user interface of the EdenBox™ Internet appliance (1910, FIG. 19). When a user enters the mail album, as illustrated in FIG. 5, the user is able to see his/her available email. When a new mail is ready in the user's server (UCDS) mail album directory, a New Mail Received message is sent to the user's Internet appliance from the UCDS.

FIG. 5 is a simplified view of a user interface screen display for a "My Site" user interface display screen. The display screen is designated generally by the numeral 500 and includes a split selection bar 502, 504, a navigation bar 506, thumbnails 508, and a status bar 510. To select the option "My Site" the user enters a reduced keyset keystroke sequence by pressing the numbered key "2". Doing so causes the "My Site" option to be highlighted (not illustrated).

Figure 6:
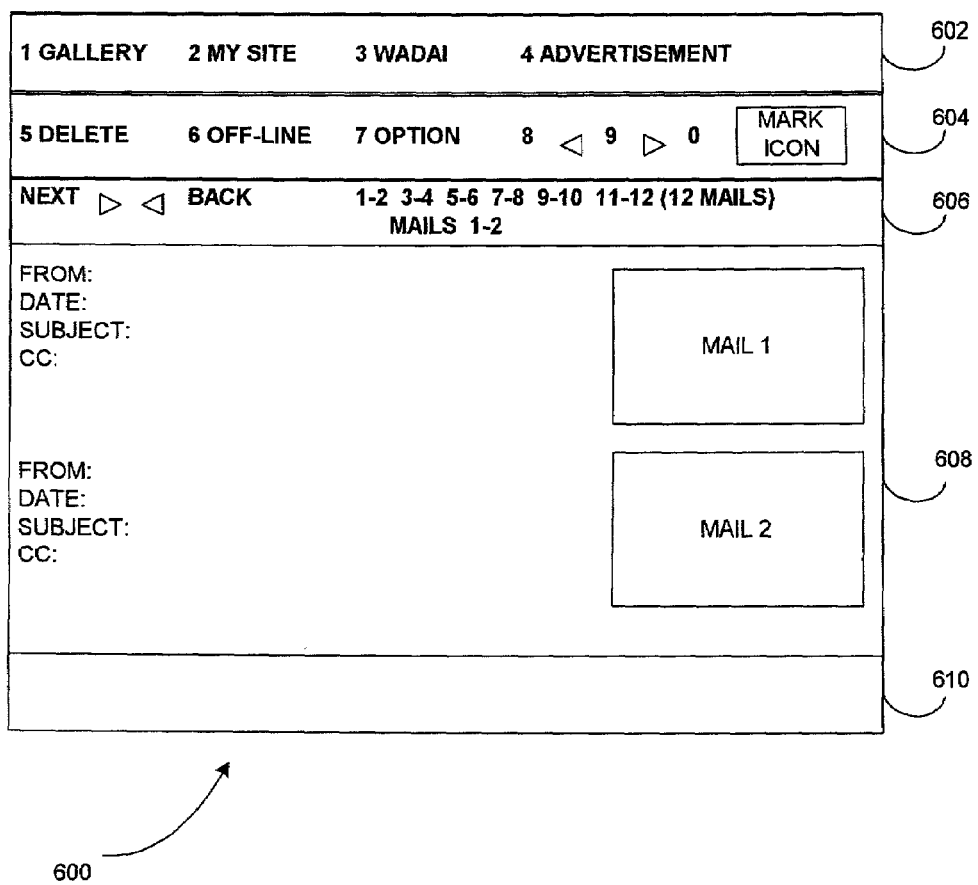
FIG. 6 is a simplified view of a user interface screen display of available email.

FIG. 6 is a simplified view of a user interface screen display of available email. The user interface display screen is designated generally by the numeral 600, and includes a split election bar 602, 604, a navigation bar 606, a received email display window 608, and a blank status bar 610.

Figure 7:
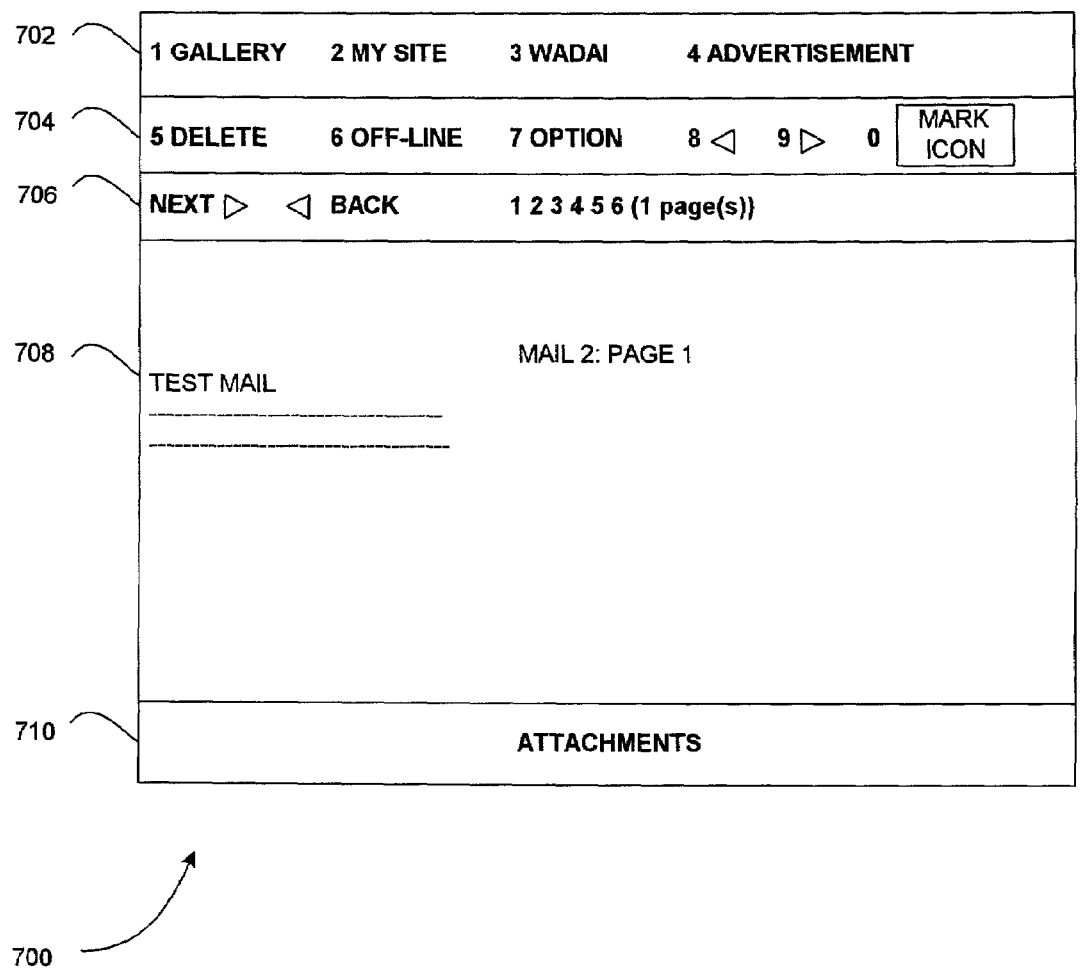
FIG. 7 is a simplified view of a user interface screen showing the body of a selected email message.

FIG. 7 is a simplified view of a user interface screen showing the body of a selected email message, and is designated generally by the numeral 700. The user interface display screen 700 includes a split election bar 702, 704, a navigation bar 706, a window 708 displaying the body of a selected received email, and a status bar 710.

Figure 8:
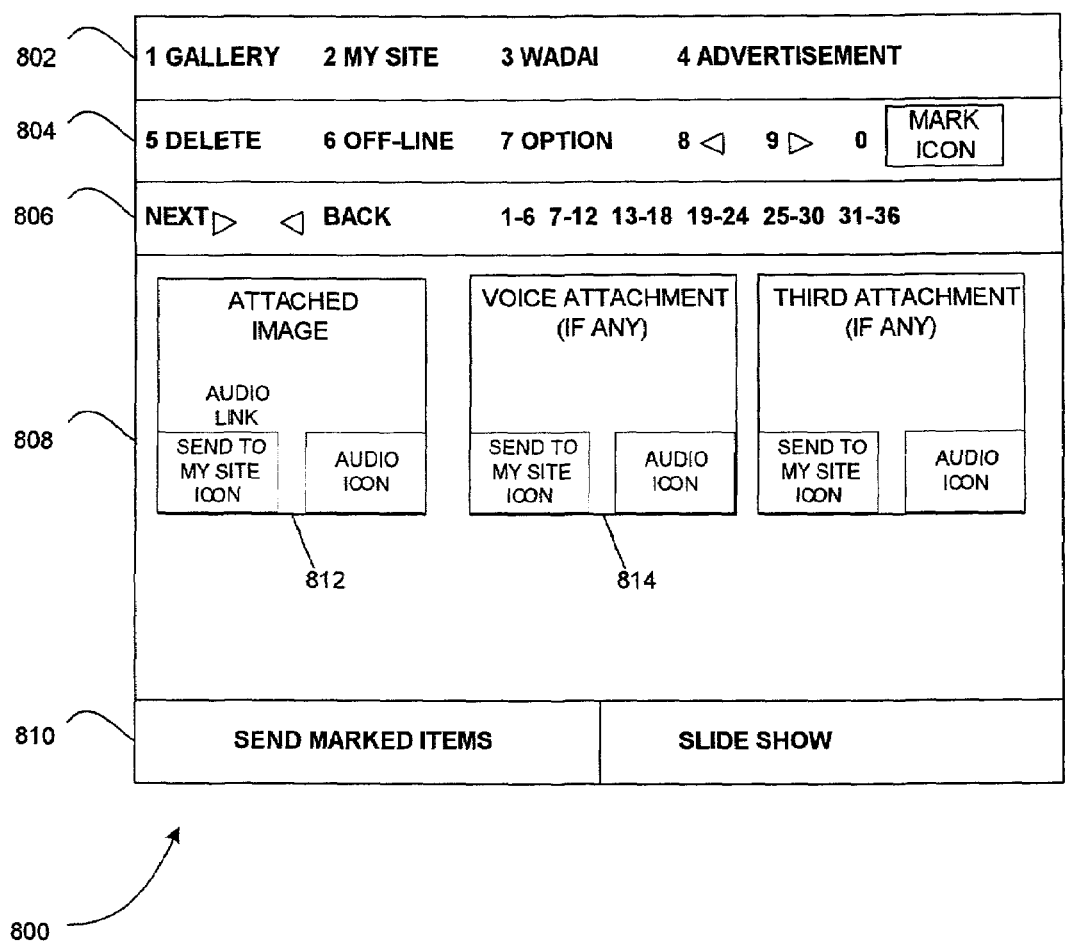
FIG. 8 is a simplified view of a user interface screen showing available email attachments.

FIG. 8 is a simplified view of a user interface screen showing available email attachments, and is designated generally by the numeral 800. The user interface display screen 800 includes a split election bar 802, 804, a navigation bar 806, a window 808 displaying received email attachments, and a status bar 810.

FIG. 6 illustrates a user interface within the mail album. The interface permits the user to select a specific email. Thumbnail views of file attachments are displayed along with the listed emails. The body of the mail is shown in FIG. 6. The attachment part of an email is shown in FIG. 8. When there is an audio attachment, a stylized thumbnail is associated with it.

The first picture 812 in FIG. 8 shows a thumbnail version of a sent image. The second image 814 showing waves represents (not illustrated as described) an audio attachment. Whenever an audio is attached to an email, a stylized thumbnail showing sound waves or indicating sounds is displayed. Selection of the sound waves attachment enables the user to listen to the attached sound file.

FIG. 4 is a functional block diagram that illustrates a mail receive process (mail receive module). The process is designated generally by the reference numeral 400 and includes a checking for mail step 402, a query step 404 for determining whether new users have logged onto the system, a test 406 to determine whether a user can download mail, a step 408 for downloading all mail files for a user, a housekeeping step 410, a test 412 to determine whether an email includes multi-part boundary information, a step 414 for processing multi-part boundary emails, a step 416 for reading and decoding the email body information, a step 418 for parsing email attachment files, a step 420 for reading attachment headers, a test 422 to determine whether the attachment type is supported by the UNIQA server, a bypass step 424 for non-supported attachment types, a step 426 for supported attachment decoding, and a step 428 for attachment file renaming.

The mail receive module 400 polls 404 for the client list of each logged on Internet appliance from the user database. In a specific embodiment, the polling is repeated at predetermined intervals every 24 hours. The predetermined polling interval is configurable by a UNIQA system 1904 administrator, and is done in order to receive newly logged on user information, and also user information for new users. During this polling for user information, the mail receive modules obtains:

A user ID

A user login password.

All user information is encrypted at the Internet appliance (see related provisional patent application, Docket No. UNIQA-3234) while being transferred and the user information is also kept encrypted while being processed.

The mail receive module functions as a daemon module. After a predetermined and system-administrator-configurable interval, the mail receive module connects to the SMTP server and checks mail 406 for all clients (again, "client", "user", and "Internet appliance" are used interchangeably unless otherwise stated: a user accesses the UNIQA system 1904 via an Internet appliance 1910, and each Internet appliance 1910–1914 has a client relationship with the UNIQA server 1908). When mail is available for any client, the mail receive module 400 downloads all emails for that client 408 in a temporary file. Then a mail process module 410 is called. The mail process module 410 separates all the emails and from each email, all the attachment(s), data file(s), image and audio files are collected. Also when any mail body text is available, the text is copied 416 into a separate text file. The image and audio files arrive as attachments, and must be MIME decoded and stored 426 in individual image and audio files. The decoded files are copied 428 to the available mail directory of the client's data directory in the UNIQA server 1908. In a specific embodiment, each mail server contains, at most, a predefined maximum number of attachment files.

As discussed earlier, the mail receive module daemon 400 makes a new socket connection with the POP mail server 1906 after a predefined interval. The mail receive module 400 connects to the POP server 1906 and checks mail for all clients 402. When email is available for any client, all available email for the client is downloaded into separate mail files at the UNIQA server 1908. It should be noted that a client downloads a maximum of files only, that maximum being the difference of the maximum allowed mail number and the number of existing mails. The mail receive module 400 then collects all the image and audio files. As these files are MIME encoded in the attachment area of the email, they will be MIME decoded before extracting the attachment file contents. Supported standard MIME encoding systems include BASE64, Quoted Printable, binary and UUencode.

Once all the email for the Internet appliance is downloaded 408, the mail process module starts parsing the mails 410 for each client respectively. When any mail body text is available, it is copied 416 into a separate text file. When no mail body exists, a 0-byte file is created, and hence there is always a file created 416 for each mail received. The mail process then determines whether there is an attachment 418. As the image and audio files will come as attachments, they must be MIME decoded 426 and then stored in individual image and audio files. All these files are copied to the predefined mail directory of the client's data directory in the server. There will be only one of the said predefined mail directory for a user and all the mail files will be stored there. A mail file name will reflect the file serial number in the particular mail and also the mail number in the mail directory so that it is possible to detect which file belongs to which mail 428. For example, image files for the third mail should be named 3.1.jpg, 3.2.jpg and so on. The second number indicates the file serial number in the third mail and the first number is the mail serial number (3rd in this case). The mail body text file is named 3.txt for the third mail.

The received emails contain any number of image and audio files as attachments in any order. Using the configuration file, one can configure which type of data file attachment will be copied and which type of attachment (i.e., data file) is to be discarded. Any mail without a single valid attachment type will be discarded. If a user already has a maximum number of mails, the users mails will not be fetched from the POP server.

An Internet Appliance

Figure 13:
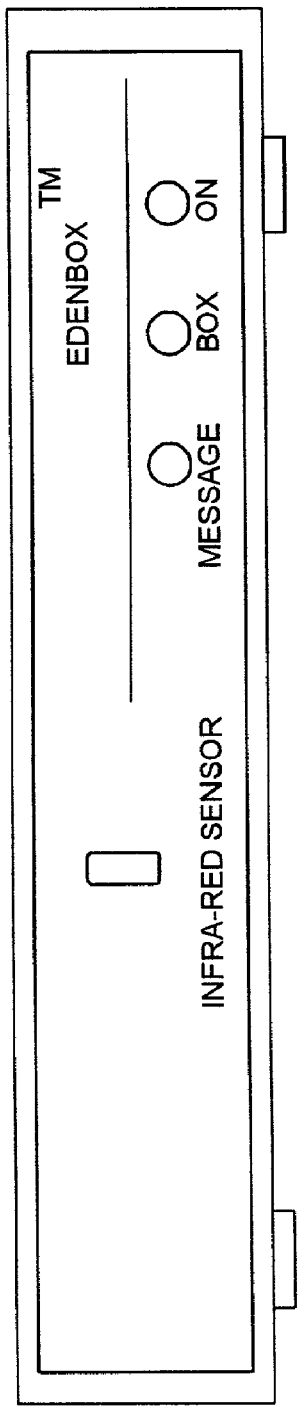
FIG. 13 is a front panel view of an Internet appliance (EdenBox™) used with the present invention.
Figure 14:
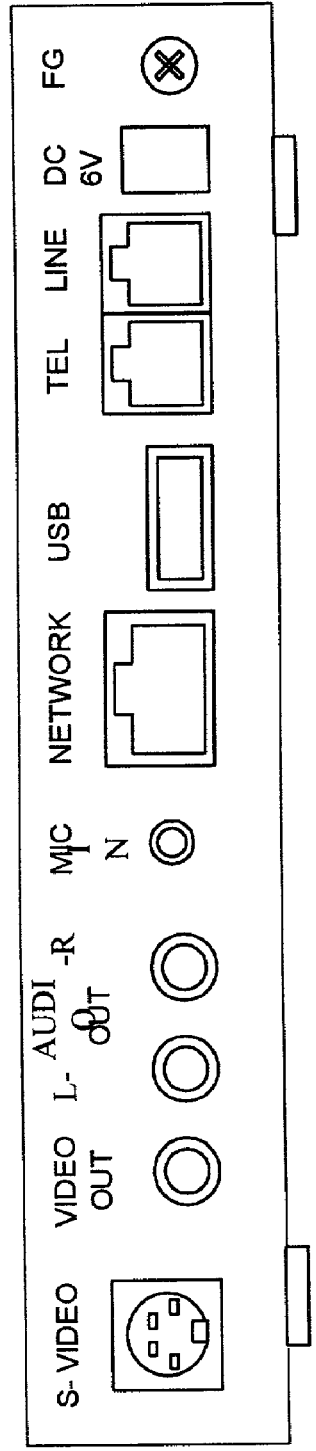
FIG. 14 is a view of a back panel of an Internet appliance (EdenBox™) used with the present invention.

An Internet appliance (FIGS. 13, 14) is a small device that includes a processing unit; a wired or wireless network connection section such as a modem for communication with a network; a video section including a video signal output, such as a television interface for outputting video and audio signals, or separate video and audio signal outputs, and a user interface signal receiver for receiving user interface signals (a reduced keyset keystroke sequence) from a reduced-keyset user interface device, such as a consumer-type remote control unit. The above components are preferably contained in a housing or provided on the outside surface of the housing to form an integral unit. The processing unit is connected to the network connection section, the video section and the user interface signal receiver and controls all functions of the Internet appliance.

Figure 9:
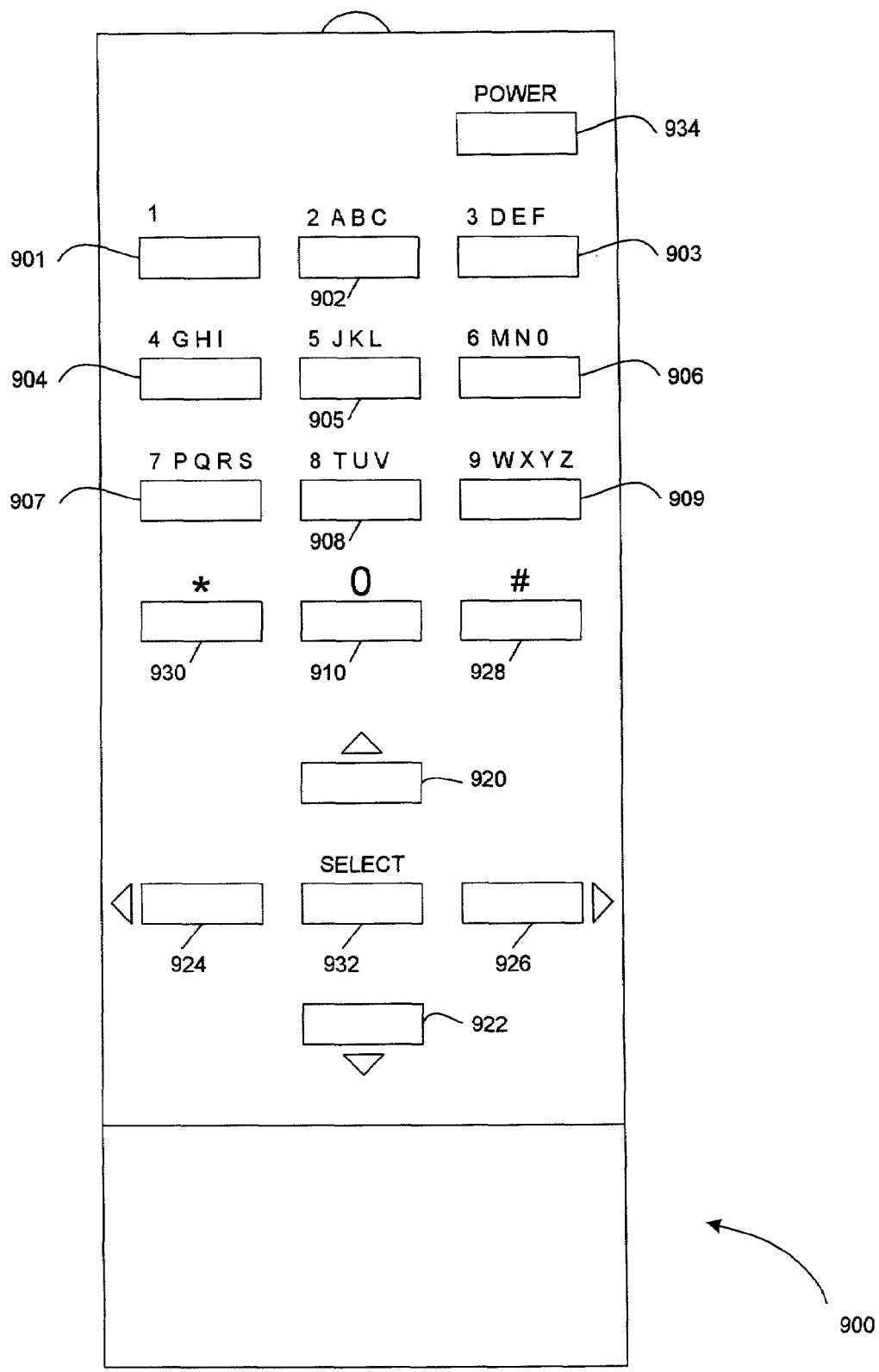
FIG. 9 is a layout view of a typical reduced keyset user interface device for use with an Internet appliance according to another aspect of the invention.

A reduced keyset user interface device is a device that has a small number of keys and transmits a small number of keystroke signals associated with the keys. As used in this specification, the term "reduced-keyset user interface device" does not include a device that has a full text-entry keyboard. FIG. 9 illustrates a reduced keyset user interface device configured as a remote control unit.

The video section of the Internet appliance can be connected to a display such as a television for displaying information, and the Internet appliance unit typically does not have its own video display or other graphic display devices in the interest of reducing the device size. The user interface signal receiver is the only device for receiving user interface information from the user (via the reduced-keyset user interface device), and the Internet appliance unit does not have its own keyboard input device with text-entry keys. The lack of an integral video display device and a keyboard allows the Internet appliance to have a compact structure. User interface is provided solely through the cooperation of the video display and the reduced-keyset user interface device.

Several features may be added to most Internet appliances, although not required, including: an audio output, an audio input, a video input, and visual indicators for monitoring system readiness and receipt of new email messages. These features may be actual input and output devices such as a speaker, a microphone, and a video camera that are housed in the housing, if they can be made sufficiently compact. Alternatively, there are input and output signal terminals provided on the housing for connecting with external devices such as speakers, microphones and video or digital cameras (USB connector 9). The audio and video inputs are used to capture and store voice and image information from the user. The audio output may be used to produce a user-feedback sound such as a beep or click each time a user key press on the user interface device is received and processed. If a key press is received but ignored because it is currently invalid, the user interface remains silent or makes a different (error) sound. The visual indicators, such as an LED panel, are typically provided on the housing for providing the user with visual indications of system statuses.

The Internet appliance according to embodiments of the present invention cooperates with a reduced-keyset user interface device to accomplish all user interface functions. As used in this specification, the term "reduced-keyset user interface device" refers to an input device having a small number of numeric, direction (arrow) and function keys that generates a small set of keystroke signals. The term reduced-keyset user interface device does not include a device that has a full text-entry keyboard. In this specification, the description "a small number of keys" is understood to mean a set of ten numeric keys, a set of four direction keys, and a limited number (such as 3–5) of function keys. An example of a reduced-keyset user interface device is a consumer-style remote control unit. Another example is the keypad of a cellular phone. In other words, cellular phones, which have infrared and/or radio frequency transmitters and receivers, may be used to interact with an Internet appliance.

FIG. 9 illustrates a layout of a typical reduced-keyset user interface device, designated generally by the numeral 900. The reduced keyset user interface device 900 includes a set of ten numeric keys 901–910, four arrow or direction keys (Up 920, Down 922, Left 924, and Right 926), a Pound key ("#") 928, a Star key ("*") 930, a Select key 932, and an On/Off toggle key (POWER) 934. This preferred layout of 18 keys is optimized for ease of use and operation. This key set has the additional advantage that it is very similar to the keypad found on cordless telephone handsets (such as the Star and Pound keys). Of course, the keys on the user interface device, especially the function keys such as the Pound, Star and Select keys (12, 13 and 14), may be labeled differently without affecting the basic function of the user interface device. In addition, more or fewer keys may be used, and auxiliary keys such as Shift, Control or Alt keys may be provided to expand the number of keystroke signals. A keystroke input device satisfies the requirement of a reduced-keyset user interface device according to the present invention so long as it has relatively few function keys and does not have a full set of text-entry keys. Further, depending on application, the reduced-keyset user interface device may be a wireless or wired device, or integrally provided on the housing of the Internet appliance.

For example, for fax-compatible appliances to be used in shared environments (like an office), it may be preferable to provide the user input keypad directly on the housing of the appliance, rather than having a separate "remote control" type input device. This minimizes the risk that the user input device is separated from the appliance and lost.

A graphical user interface (GUI) that enables a user to fully interact with an Internet appliance using a reduced-keyset user interface device is described in commonly assigned, co-pending patent application entitled "Internet Appliance Using a Reduced-Keyset User Interface Device," which is incorporated herein by reference in its entirety.

An Internet appliance has a network connection section and is preferably connected to a network. A networked Internet appliance may be referred to as a "client device", and information may be processed by a multitude of servers on the Internet. The local client device has information processing capabilities, but it typically requires resources on the Internet to accomplish a large part of its functions. An Internet appliance, however, is typically able to perform certain information processing functions even when the network connection is inactive. The term Internet appliance is not intended to be limited to devices having any particular network connection configuration, and includes devices that are stand-alone for at least a part of the time.

A typical network connection is to the Internet, but other types of network may also be used, such as an Intranet. For internet appliances that connect to the network using a modem, an Internet Service Provider (ISP) is typically employed to provide the hardware and software infrastructure that provides the link between the modem in the appliance and the other systems on the network to which it connects. The Internet appliance is connected to a local telephone exchange office via a telephone line. An ISP AP/POP (Access Point/Point of Presence) is connected to the local telephone exchange office via a multi-line telephone service and to the internet backbone via a digital network connection such as T1, T3 or T5 lines. An Internet appliance network connection using a telephone modem is suitable for appliances that operate with fax systems, but the category of Internet appliance devices are not limited to those employing a modem for their network connection. Any network connection technology, wired or wireless, may be employed by an Internet appliance.

EXAMPLE

Sending Digital Content Via Email

Figure 10:
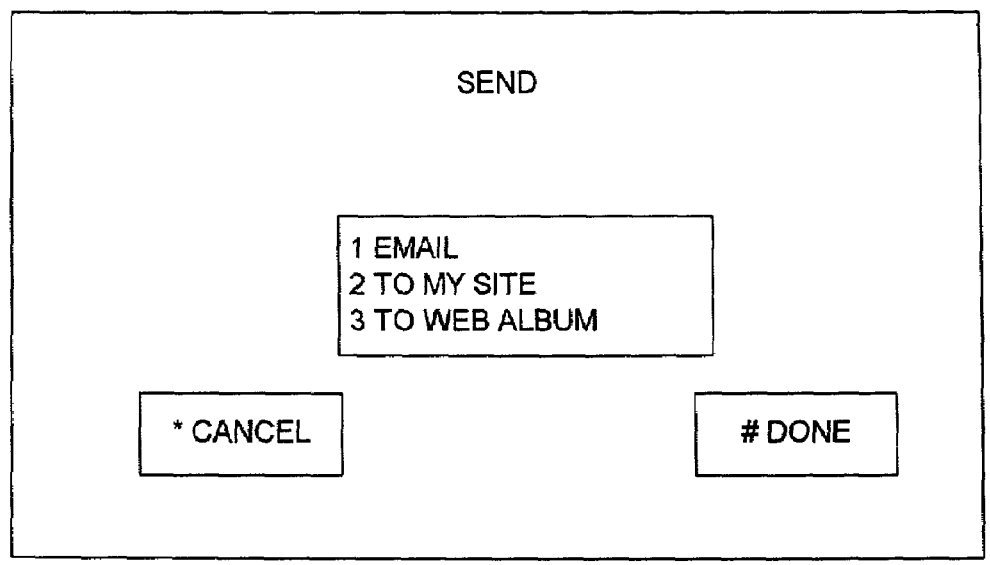
FIG. 10 is a simplified view of a Send dialog box.
Figure 11:
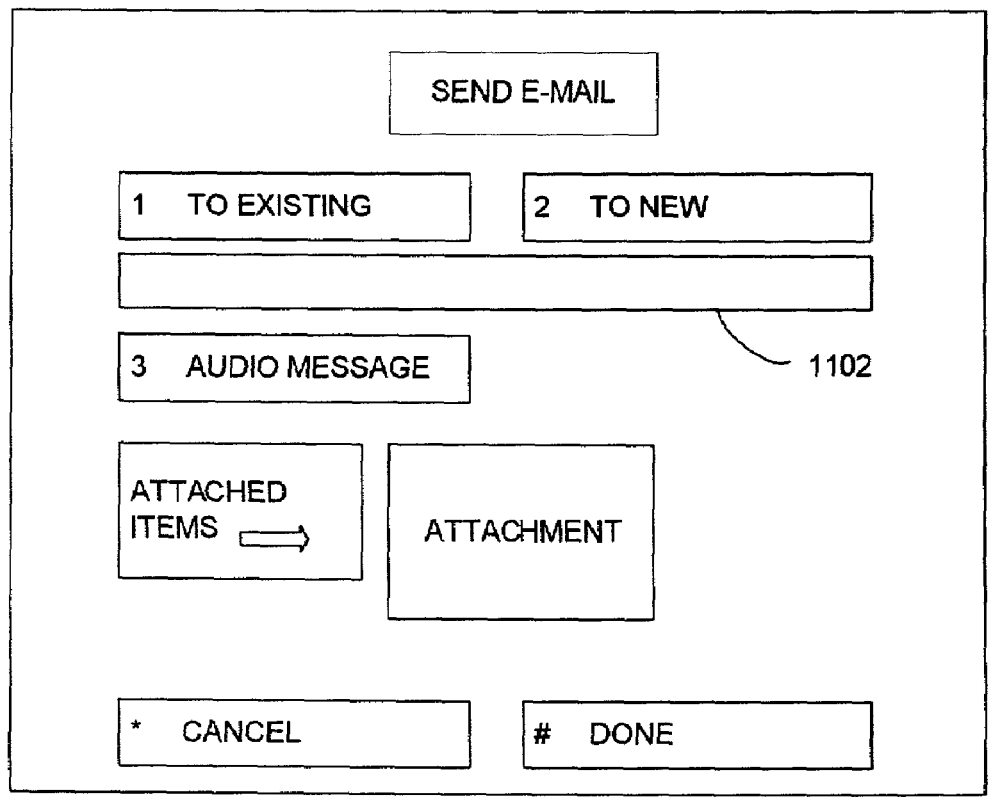
FIG. 11 is a simplified view of a Send E-mail dialog box.
Figure 12:
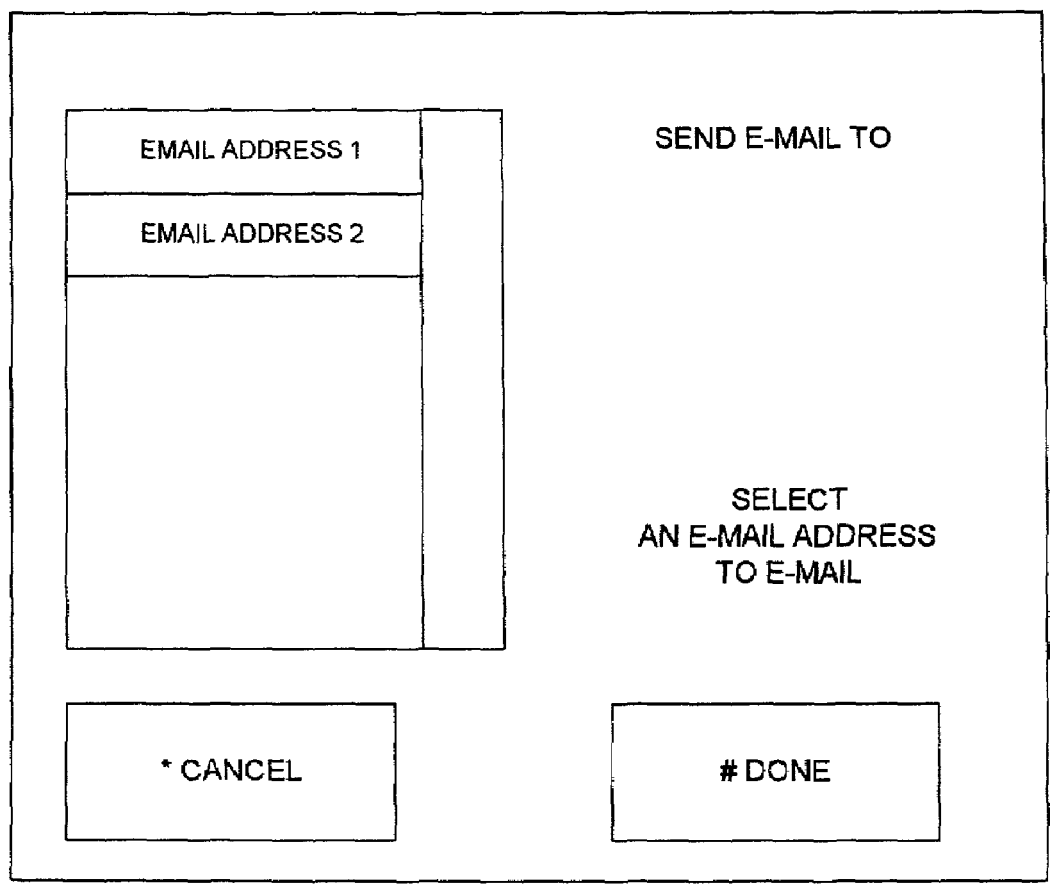
FIG. 12 is a simplified view of an Existing E-mail Address list.

1. Press "2" on the remote control unit ("RCU") (FIG. 9) to move to the MYSITE mode. The first view you see is the Album Selection View, which displays the first four albums available. If you do not see the album of your choice in this view, highlight the "NEXT" link (512 of FIG. 5) and press SELECT 932.
2. Use the RCU arrow keys 920–926 to move the highlight (FIG. 5) to the album you want to enter and then press SELECT.
3. The Multiple Picture View will now be displayed, with the first six pictures of the album. If the picture you want to send by e-mail is not on display, highlight the next link of pictures "7–12" or "Next" and press SELECT. Continue this until you see the picture you want to send.
4. Move the highlight to the picture of your choice. Then use the arrow keys to move the highlight to the "Send" icon link and press SELECT.
5. A dialog box appears (FIG. 10), listing three choices for you. Since you want to e-mail the picture, press the associated number key of the RCU (in this case "1") and then press "#".
6. Another dialog box appears (FIG. 11), asking you to choose whether to send the picture to an existing e-mail address or to send it to a new one. To send the picture to an existing address, press the associated number key "1".
7. A list of e-mail addresses appears (FIG. 12). Use the UP or DOWN keys to select an address and then press "#". The address now appears in the e-mail dialog box (1102 of FIG. 11). Press "190 " once more and your mail is sent!
8. If you want to send the picture to a new address, press the associated number key for the new address button. Refer to the section "Creating and Editing an Email Message", below, for the process to enter a new address.
9. Once done, press "#". The address you entered now appears in the e-mail dialog box (1102 of FIG. 11). Press "#" once more and your mail is sent.

If your mail was successfully delivered, you will not receive any confirmation message. You will only receive a confirmation message in case of an unsuccessful mail delivery attempt.

EXAMPLE

Creating and Editing An Email Message

Before going into details, it must be remembered that one cannot assign a name containing underscore or spaces for a new album in the Create New Album command. However, all combinations of letters, digits, spaces and underscores are supported for sending mails. For convenience, the user interface supports some of the popular mail domain extensions corresponding to numeric keys.

Figure 15:
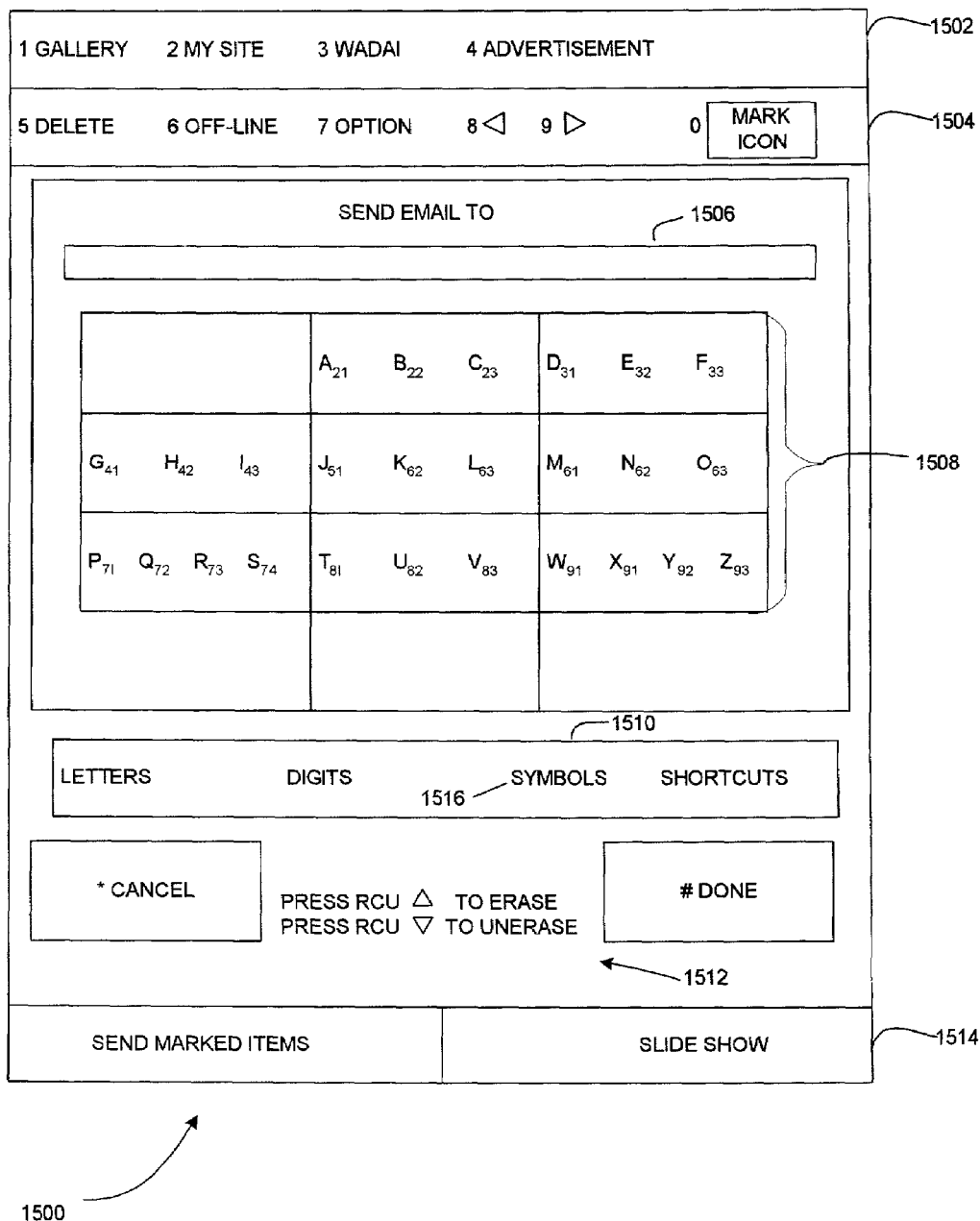
FIG. 15 is a simplified view of an E-mail text entry screen with alphabet entry selected.
Figure 16:
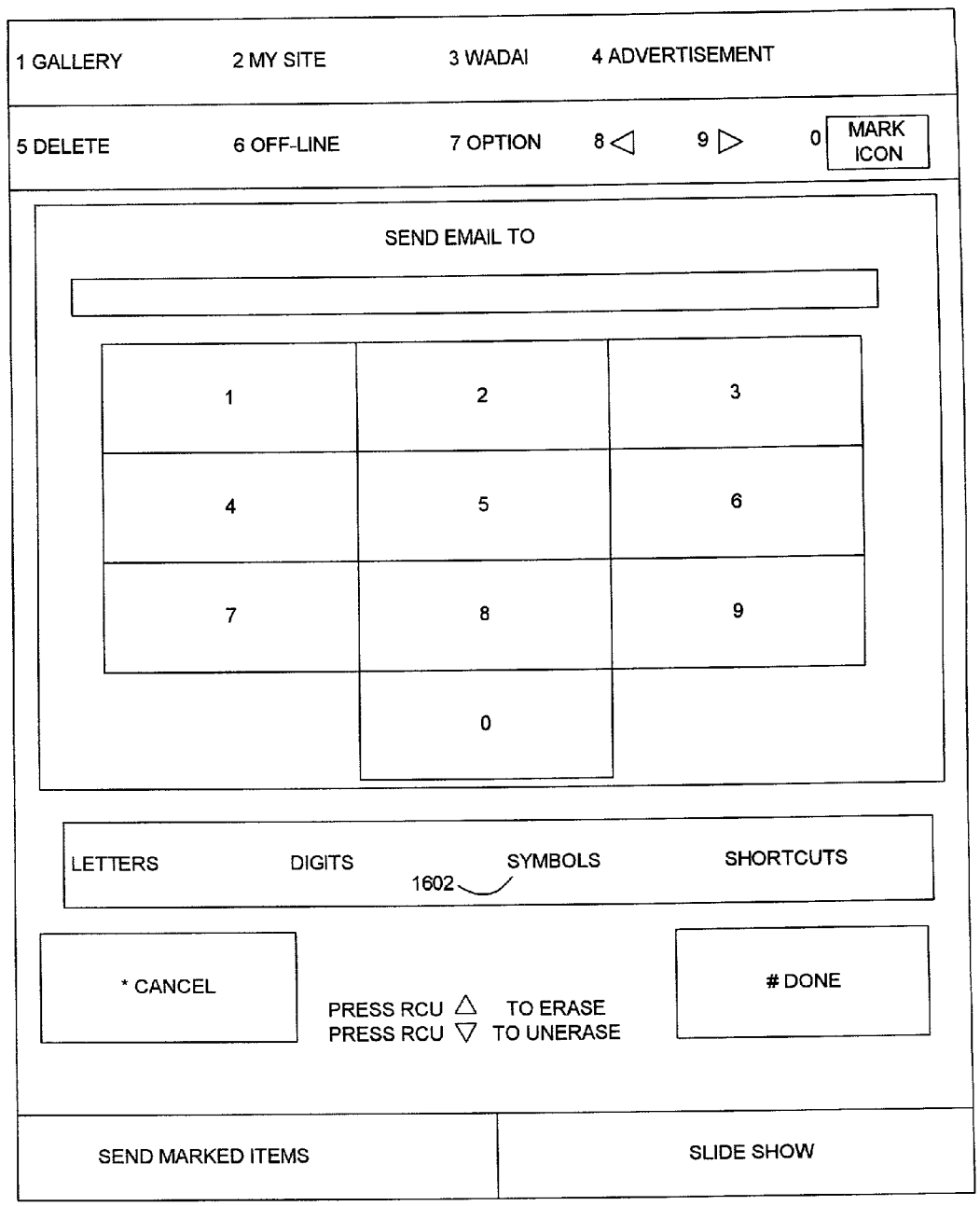
FIG. 16 is a simplified view of the E-mail text entry screen with number entry selected.
Figure 17:
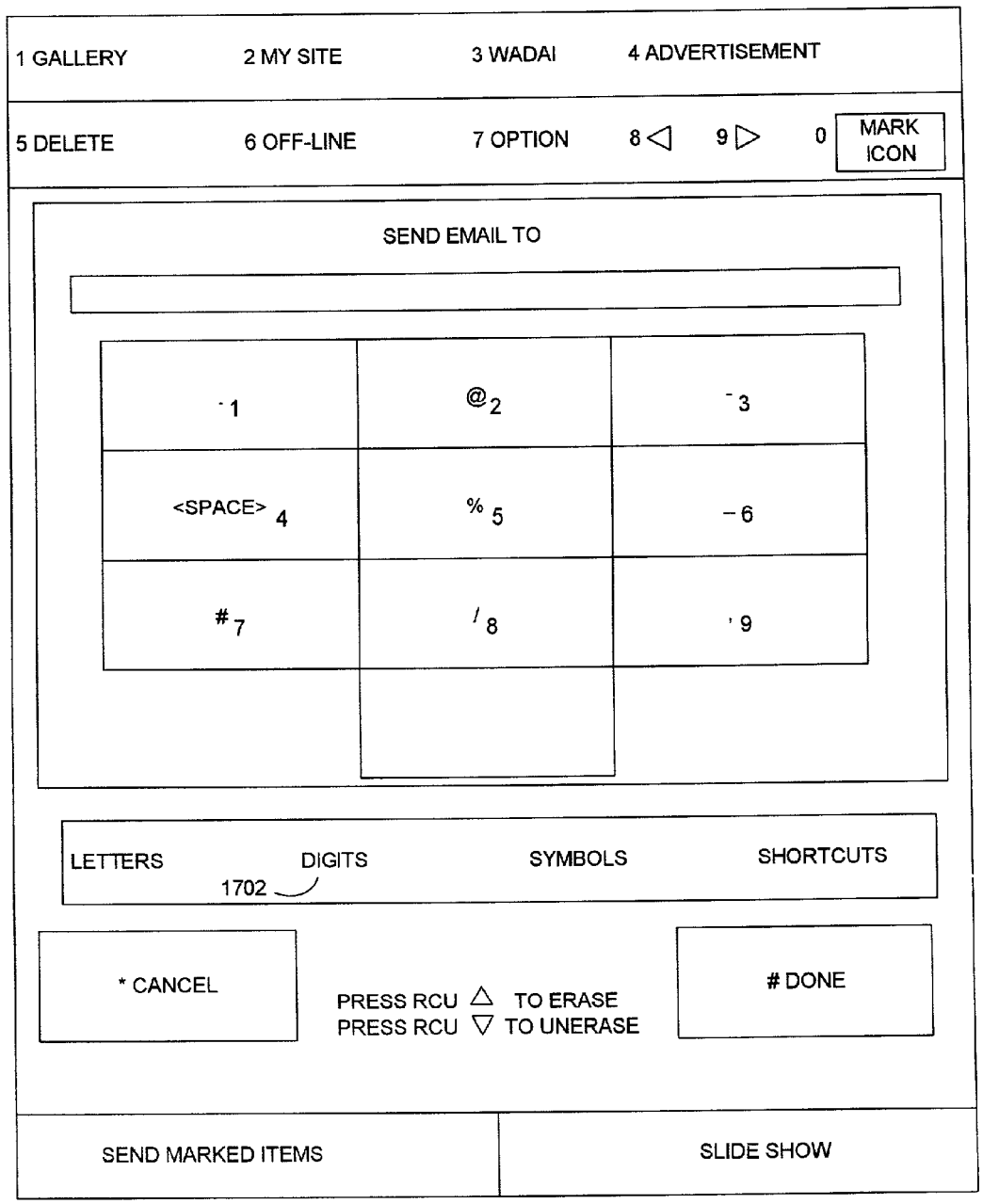
FIG. 17 is a simplified view of the E-mail text entry screen with special symbol entry selected.
Figure 18:
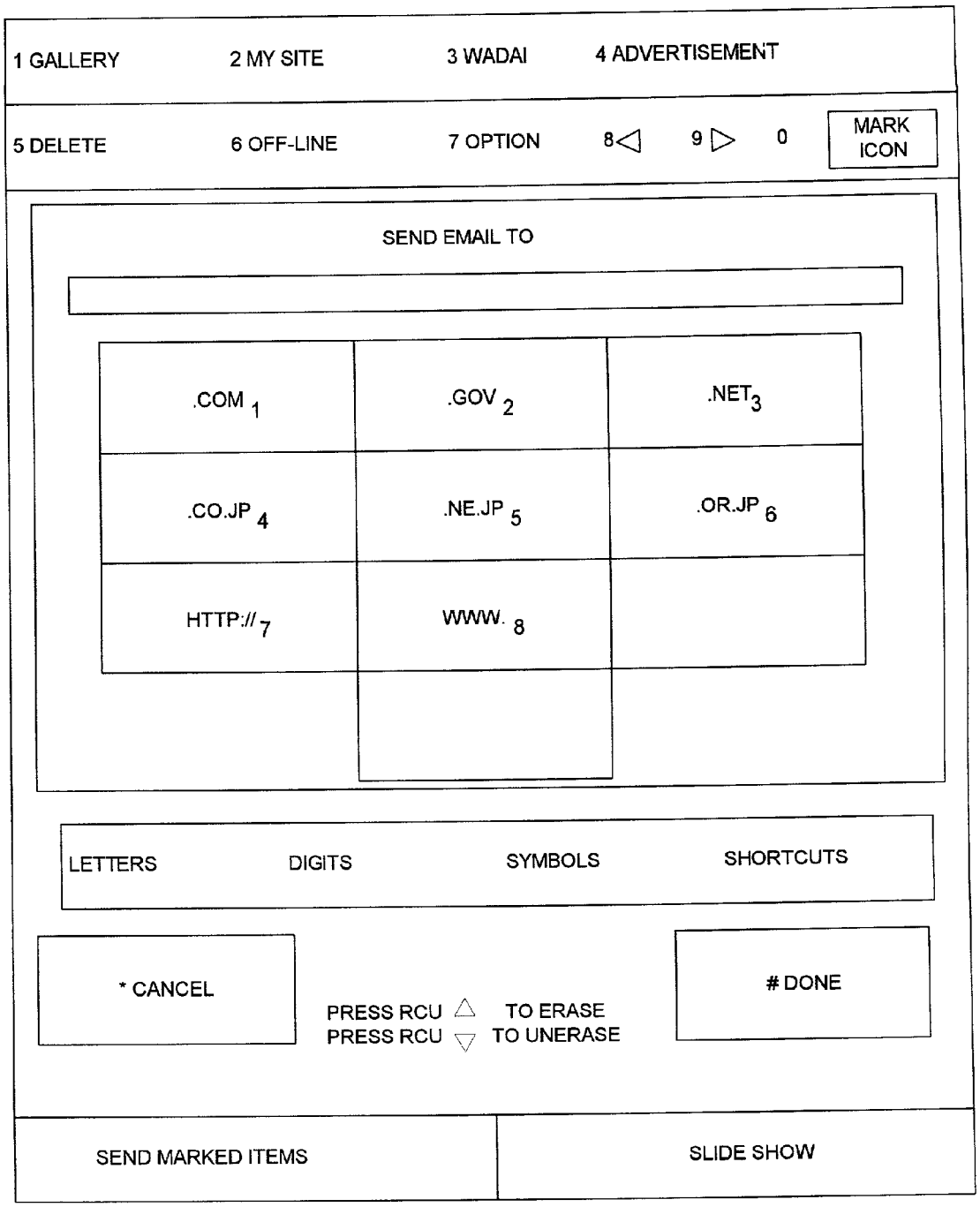
FIG. 18 is a simplified view of the E-mail text entry screen with shortcut entry selected.

A simple example for entering the necessary text for sending an email follows. If, for instance, the mail address is ubik 24@uniga.com then the text entry operation would be:

1. Type the corresponding numeric key of the relevant alphabet. In this example, the letters 'ubik' are input by pressing the following key sequence on the hand-held reduced keyset user input device (FIG. 9):
   u=82 b=22 i=43 k=52
   FIG. 15 illustrates a text entry user interface display screen, designated generally by the numeral 1500. The screen 1500 includes selection bars 1502, 1504, a text entry ("mail field") window 1506, an alphabet letter selection display 1508, an input mode selection bar 1510, a control button template indicated generally by the numeral 1512, and a status bar 1514.
   That is, the corresponding key for u is 82. So press '8' followed by '2' to get the character 'u' in the mail field. Similarly press '22' for 'b', '43' for 'i', '43' for 'k'.
2. For the underscore, press SELECT on your RCU to move the cursor to highlight SYMBOLS 1516, and there (FIG. 17) you will find the underscore character corresponding to the numeric '6'.
3. For the remaining digital number '24' pertaining to the mail address, once again press SELECT on the RCU to go to DIGITS 1702 (bringing up the Numbers screen, FIG. 16) and press '2' followed by '4'.
4. For the symbol '@' once again you will find the symbol in SYMBOLS (FIG. 17). From the Numbers screen, use the RCU SELECT key to highlight SYMBOLS 1602. At the SYMBOLS screen press the RCU key '2' for the '@' symbol.
5. Now for the remaining domain part. At the SYMBOLS screen (FIG. 17), press SELECT on the RCU until the LETTERS label is highlighted. Then at the Letters screen, use the numeric keypad of the RCU to enter the letter sequence 'uniqa'. Then use the SELECT key to highlight the SHORTCUTS label. This keystroke sequence brings up the SHORTCUTS screen (FIG. 18). Since '.com' is a common domain extension, we have the shortcut ready for you in the SHORTCUT section.
6. Just press "1" on the RCU for the ".com" extension and your mail address is complete! In case the shortcut of the extension is not available, you will have to follow the usual way of typing the text as just described above.

In case of any correction you need to make, you can always erase by pressing the UP key on the RCU, and un-erase by pressing the DOWN key.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following claims.

The invention claimed is:

1. A system for exchanging digital content files as email attachments, comprising:
   a system server connected to a communications network and implementing a standard electronic mail protocol for sending and receiving email and digital content email attachments via the communications network;
   the system server having storage and retrieval means for a plurality of user interface display screens and digital content files;
   an Internet appliance for receiving a reduced keyset keystroke sequence, a connection with the communications network for establishing a client relationship with the system server, a browser for accessing user interface display screens via the network connection, a video/audio converter providing output signals compatible with a standard television receiver for display of accessed user interface display screens, and hyperlink selection means responsive to the received keystroke sequence for navigating an accessed user interface display screen;
   the user interface screens and the reduced keyset keystroke sequence defining a text entry and editing protocol, an email creation and addressing protocol, an email viewing protocol, and an email deletion protocol;
   the user interface screens and the reduced keyset keystroke sequence also defining an email attachment selection protocol permitting selection of digital content files for attachment to a user created email;
   the system server including means responsive to the email attachment selection protocol and the reduced keyset keystroke sequence for retrieving a selected digital content file, and for encoding the retrieved file as a standard email attachment;
   the system server including means for establishing a connection via the communications network with a standard email server, and for sending an email and the encoded attachment to the email server using the standard email protocols;
   the system server including means for establishing a connection via the communications network with the email server for receiving email and encoded attachments, for decoding the attachments, for storing the received email and decoded attachment, and for notifying the Internet appliance that an email and attachment has been received.

2. The system of claim 1, further including hand-held reduced keyset means for creating and transmitting the reduced keyset keystroke sequence.

3. The system of claim 2, wherein the hand-held reduced keyset means defines a remote control unit that transmits the reduced keyset keystroke sequence as an infra-red beam, and wherein the Internet appliance is adapted for receiving the infra-red beam.

4. The system of claim 2, wherein the hand-held reduced keyset means defines a wireless telephone, and wherein the Internet appliance is adapted for receiving the reduced keyset keystroke sequence from the wireless telephone.

5. The system of claim 1, further including a standard television receiver connected to receive the converted video/audio output signals for display of user interface display screens and embedded hyperlinks, including system email protocol display screens, received emails, entered text, screens permitting text editing, digital content file selection, and email recipient address selection and entering.

6. The system of claim 1, wherein the defined email protocols include a user interface display screen and keystroke parsing engine for converting a reduced keyset keystroke sequence to text and displaying the text as the body of a new email.

7. The system of claim 1, wherein the defined email protocols include a user interface display screen and keystroke parsing engine for interpreting a reduced keyset keystroke sequence as editing commands for entered text within the body of the new email and for displaying an editing process.

8. The system of claim 1, wherein the defined email protocols include a user interface display screen and parsing engine permitting a reduced keyset keystroke sequence to access a display of available digital content files, and selecting a digital content file for attachment to a new email.

9. The system of claim 1, wherein the defined email protocols include a user interface display screen and parsing engine permitting a reduced keyset keystroke sequence to display available email recipient addresses, to edit a displayed address, and to enter a new email recipient address.

10. The system of claim 1, wherein the defined email protocols include a user interface display screen and parsing engine permitting a reduced keyset keystroke sequence to select a display of a list of received emails and email attachments.

11. The system of claim 1, wherein the defined email protocols include a user interface display screen and parsing engine permitting a reduced keyset keystroke sequence to select and view a received email, and to select and view/listen to email attachments.

* * * * *